(12) United States Patent
Makino et al.

(10) Patent No.: US 10,207,572 B2
(45) Date of Patent: Feb. 19, 2019

(54) TWO-MOTOR VEHICLE DRIVE DEVICE

(71) Applicant: NTN CORPORATION, Osaka-shi, Osaka (JP)

(72) Inventors: Tomoaki Makino, Iwata (JP); Ryou Yukishima, Iwata (JP); Hidenori Karasawa, Iwata (JP); Isao Hirai, Iwata (JP)

(73) Assignee: NTN CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/568,021

(22) PCT Filed: Apr. 18, 2016

(86) PCT No.: PCT/JP2016/062238
§ 371 (c)(1),
(2) Date: Oct. 20, 2017

(87) PCT Pub. No.: WO2016/171100
PCT Pub. Date: Oct. 27, 2016

(65) Prior Publication Data
US 2018/0141423 A1    May 24, 2018

(30) Foreign Application Priority Data

Apr. 20, 2015 (JP) .................. 2015-085955

(51) Int. Cl.
*B60K 1/02* (2006.01)
*F16H 1/08* (2006.01)
(Continued)

(52) U.S. Cl.
CPC ............... *B60K 1/02* (2013.01); *B60L 15/20* (2013.01); *F16H 1/08* (2013.01); *F16H 55/14* (2013.01);
(Continued)

(58) Field of Classification Search
CPC ............. B60K 1/02; B60K 2007/0038; B60K 2007/0061; B60L 15/20; B60L 2220/46;
(Continued)

(56) References Cited

U.S. PATENT DOCUMENTS 6,155,364 A * 12/2000 Nagano .................. B60K 6/365
180/65.235
6,402,654 B1 * 6/2002 Lanzon ................ B60K 17/344
475/204

(Continued)

FOREIGN PATENT DOCUMENTS

JP    H5-27395 U     4/1993
JP    H11-243664 A   9/1999
(Continued)

*Primary Examiner* — Jacob B Meyer
(74) *Attorney, Agent, or Firm* — Muncy, Geissler, Olds & Lowe, P.C.

(57) ABSTRACT

Helical gears in gear trains of speed reducers generate thrust forces in directions not to separate a speed reducer casing which has an axial three-piece structure, whereby leakage of lubricant oil from between separated surfaces in the speed reducer casing is prevented. Output gear which generates large thrust force on the final stage in each gear train of the speed reducers both generated inward forces, so that the center casing does not receive forces in directions in which the left and the right casings is separated therefrom.

4 Claims, 8 Drawing Sheets

(51) Int. Cl.
*F16H 57/023* (2012.01)
*H02K 7/116* (2006.01)
*B60L 15/20* (2006.01)
*F16H 55/14* (2006.01)
*F16H 57/02* (2012.01)
*F16H 57/028* (2012.01)
*B60K 7/00* (2006.01)
*H02K 5/173* (2006.01)

(52) U.S. Cl.
CPC ..... *F16H 57/023* (2013.01); *F16H 57/02004* (2013.01); *F16H 57/028* (2013.01); *H02K 7/116* (2013.01); *B60K 2007/0038* (2013.01); *B60K 2007/0061* (2013.01); *B60L 2220/46* (2013.01); *H02K 5/1732* (2013.01)

(58) Field of Classification Search
CPC .. F16H 57/02004; F16H 57/028; F16H 55/14; F16H 57/023; F16H 1/08; H02K 7/116; H02K 5/1732
See application file for complete search history.

(56) References Cited

U.S. PATENT DOCUMENTS

| | | | | |
|---|---|---|---|---|
| 6,557,656 | B2 * | 5/2003 | Haniu | B60K 6/24 180/65.21 |
| 6,666,103 | B2 * | 12/2003 | Gotoh | B60K 6/36 74/412 R |
| 6,802,230 | B2 * | 10/2004 | Obinata | F16H 3/093 74/410 |
| 6,896,080 | B2 * | 5/2005 | Takenaka | B60K 6/36 180/65.235 |
| 6,952,061 | B2 * | 10/2005 | Mogi | H02K 5/1732 310/75 R |
| 8,348,800 | B2 * | 1/2013 | Tanaka | B60K 1/00 475/160 |
| 8,678,118 | B2 * | 3/2014 | Takenaka | B60K 1/02 180/65.1 |
| 8,727,928 | B2 * | 5/2014 | Harashima | B60K 1/00 180/65.31 |
| 8,968,137 | B2 * | 3/2015 | Bausch | B60K 1/00 180/65.6 |
| 10,018,259 | B2 * | 7/2018 | Arnelof | F16H 37/046 |
| 2001/0050190 | A1 * | 12/2001 | Takenaka | B60K 6/36 180/65.235 |
| 2002/0033061 | A1 * | 3/2002 | Gotoh | B60K 6/36 74/410 |
| 2004/0130224 | A1 * | 7/2004 | Mogi | H02K 5/1732 310/75 R |
| 2011/0139522 | A1 * | 6/2011 | Takenaka | B60K 1/02 180/65.1 |
| 2011/0203898 | A1 * | 8/2011 | Harashima | B60K 1/00 192/219.4 |
| 2011/0207570 | A1 * | 8/2011 | Tanaka | B60K 1/00 475/150 |
| 2018/0141423 | A1 * | 5/2018 | Makino | B60K 1/02 |

FOREIGN PATENT DOCUMENTS

| | | |
|---|---|---|
| JP | H11-270636 A | 10/1999 |
| JP | 2004-175261 A | 6/2004 |
| JP | 2010-48379 A | 3/2010 |
| JP | 2013-99842 A | 5/2013 |

* cited by examiner

FIG. 6 —PRIOR ART—

TWO-MOTOR VEHICLE DRIVE DEVICE

TECHNICAL FIELD

The present invention relates to a two-motor vehicle-driving apparatus which includes two electric motors each for driving one of a left and a right driving wheels independently from each other, and speed reducers.

BACKGROUND ART

Patent Literature 1 and Patent Literature 2 disclose two-motor vehicle-driving apparatuses, each composed of: two electric motors each for driving one of a left and a right driving wheels independently from each other; and speed reducers.

A two-motor vehicle-driving apparatus of this kind provides an advantage that unlike a one-motor vehicle-driving apparatus in which a single motor must drive both the left and the right driving wheels, it does not require differential gears and other components for dividing the driving power from a single electric motor to left and right.

Also, since the two-motor vehicle driving apparatus has an electric motor for individually driving the left and the right driving wheels independently from each other, it is easy to drive the left and the right driving wheels with different amounts of power from each other, and therefore it is easy to improve traveling performance through improved turning capability for example, by supplying a greater amount of driving power to a radially outer driving wheel than to a radially inner driving wheel during a turn.

As shown in FIG. 6 or FIG. 7, a two-motor vehicle driving apparatus includes: a left and a right electric motors 101 for driving the left and right driving wheels independently from each other; and two speed reducers 102 for reducing rotation speed of the electric motors 101; the two speed reducers 102 are disposed in the middle between the left and right electric motors 101.

As shown in FIG. 6 or FIG. 7, each speed reducer 102 is provided by a parallel-gear speed reducer which includes: an input gear shaft 123 having an input gear 123a for receiving driving power from a motor shaft 112; an intermediate gear shaft 124 having a large-diameter gear 124a for engagement with the input gear 123a of the gear shaft 123, and a small-diameter gear 124b for engagement with an output gear 125a; and an output gear shaft 125 having the output gear, extended from a speed reducer casing 128 for transmitting the driving power to the driving wheel via a constant velocity joint 126 and an intermediate shaft 127.

CITATION LIST

Patent Literature

Patent Literature 1: JP-A H 11-243664 Gazette
Patent Literature 2: JP-A 2010-48379 Gazette

SUMMARY OF INVENTION

Technical Problem

Each of the gears on the gear shafts 123, 124, 125 in the parallel-gear speed reducer in each of the two speed reducers 102 in the two-motor vehicle driving apparatus is provided by a helical gear, and each of the gear shafts 123, 124, 125 has its two end portions rotatably supported by the speed reducer casing 128 via rolling bearings.

As shown in FIG. 7 and FIG. 8, the speed reducer casing 128, which houses the two speed reducers 102 side by side with one on the left and the other on the right, may have a three-piece structure including a center casing 128a, and a left and a right side casings 128bL and 128bR which are fixed onto two side surfaces of the center casing 128a.

As shown in FIG. 8, the left and right side casings 128bL, 128bR are fixed onto two side openings in the center casing 128a, with a plurality of bolts 129.

As mentioned, the gears in a gear train in the speed reducer 102 are provided by helical gears.

In a helical gear, gear teeth are skewed with respect to the gear shaft, and this causes a force to be generated in an axial direction (thrust direction) when driving power is transmitted.

In Patent Literature 2, arrows are used to show directions of these forces generated by the helical gears in thrust directions when the driving powers from the electric motors are working in forward travel (forward driving) (FIG. 4 in Patent Literature 2).

Now, these thrust directional forces generated by the helical gears in forward driving shown in Patent Literature 2 appear in directions (f1, f2, f3) in a two-motor vehicle driving apparatus which has a structure as shown in FIG. 7.

The intermediate gear shaft 124 has two gears, i.e., the large-diameter gear 124a which makes engagement with the input gear 123a of the input gear shaft 123, and the small-diameter gear 124b which makes engagement with the output gear 125a of the output gear shaft 125. If the two thrust forces generated on the two gears have the same direction, the two forces will be combined to increase; in order to avoid this, the gears are designed so that the thrust directional forces (f1, f2) generated in the forward drive which is the primary direction of drive will be generated in mutually opposite directions (f1 is outward, while f2 is inward), i.e., so that a sum f3 of the forces f1 and f2 will be small.

Further, in the two, left and right speed reducers 102, i.e., in the right-hand side drivetrain and the left-hand side drivetrain, the helical gears' helical directions are selected so that the directions of the two f3 forces will be symmetrical with each other; specifically, so that both of the left and the right f3 forces are inward.

In addition, in the two, left and right speed reducers, i.e., in the right-hand side drivetrain and the left-hand side drivetrain, the thrust directional force f2 which is generated on the final stage, i.e., in the output gear 125a of the output gear shaft 125, in the forward drive is outward.

The output gear 125a of the output gear shaft 125 is the final-stage gear in the drivetrain, therefore receives a large load torque, and accordingly generates a large thrust directional force in the outward direction during the forward drive.

As described, a large outward thrust directional force is generated in the output gear 125a of the output gear shaft 125. Assume then, for example, that this gear is assembled in the speed reducer casing 128 shown in FIG. 7 which has a three-piece structure composed of the center casing 128a and the left and the right, side casings 128bL, 128bR fixed to the two side surfaces of the center casing 128a. In the left and the right gear trains, both of the last-stage output gears 125a generate large outward thrust forces, which act on the left and the right, side casings 128bL, 128bR to move outward, i.e., to be separated from the center casing 128a.

In the center casing 128a and each of the left and right side casings 128bL, 128bR, for a purpose of preventing lubrication oil from leaking from inside the speed reducer casing 128 or preventing muddy water from making entry from outside into the speed reducer casing 128, a sealing structure such as an O ring and liquid-form gasket is provided between contact surfaces of the center casing 128a and each of the left and right casing 128bL, 128bR. However, if there are forces acting to move the left and right side casings 128bL, 128bR away from the center casing 128a, the lubricant oil could leak from between the contact surfaces of the center casing 128a and the left and right side casings 128bL, 128bR.

Because the helix directions in the helical gears utilized in the conventional left and right gear trains generate forces in directions in which the left and right side casings 128bL, 128bR move away from the center casing 128a, it is necessary, for example, to increase the size of bolts 129 that fix the center casing 128a and the left and right side casings 128bL, 128bR to each other, or increase a tightening force of the bolts to increase a tightening torque of each bolt 129, or increase the number of bolts to increase a total torque, in order to prevent lubrication oil leakage from between the contact surfaces of the center casing 128a and the left and right side casings 128bL, 128bR.

A larger bolt 129 requires larger female threads and increased seating surfaces around the bolting area, which increases the weight of the speed reducer casing 128. On the other hand, increased tightening increases a risk of damaging the female threads which are formed directly in the aluminum speed reducer casing 128. Use of insert screw thread as a solution to the damaged thread requires the same trade-off, i.e., increased seating surfaces around the female thread, or increased steps in manufacturing process. Increased number of bolts 129 increases cost of female thread formation and cost of parts.

It is therefore an object of the present invention to decrease the number of bolts used for connecting the axially divided speed reducer casings, to reduce cost increase in screw hole formation and parts, making possible to decrease weight and size through improvement on the direction of the thrust directional force which is generated in the final-stage output gear of the output gear shaft when driving forward, in the right-hand side drivetrain and the left-hand side drivetrain of the two-low, left-and-right speed reducer.

Solution to Problem

In order to solve the above-described problem, the present invention provides a two-motor vehicle driving apparatus which includes two electric motors for driving a left and a right driving wheels independently from each other and two speed reducers for individually reducing and then transmitting powers from the two electric motors to the left and the right driving wheels: The two speed reducers are housed side by side on left and right in a speed reducer casing disposed at a center, with two motor casings fixed respectively on left and right thereof each for housing an electric motor therein: Each of the two speed reducers is provided by a parallel-gear speed reducer including an input gear shaft having an input gear for receiving driving power from a motor shaft, an output gear shaft having an output gear for transmitting drive power to the drive wheel via a drive shaft, and an intermediate gear shaft having a large-diameter gear for engagement with the input gear and a small-diameter gear for engagement with the output gear are disposed in parallel with each other; each gear on each gear shaft is provided by a helical gear; the speed reducer casing which houses the two speed reducers side by side on left and right has a three-piece structure consisting of a center casing and a left and a right side casings fixed onto two side surfaces of the center casing. With the above-described arrangement, directions of helix in the helical gears on each gear shaft are selected so that the helical gears which work as output gears of the output gear shafts generates inward thrust forces when the electric motors are driving the vehicle in a forward direction (forward driving).

Advantageous Effects of Invention

As described, according to the present invention, both of the large thrust forces on the final stage of the gear trains which serve as the left and the right drivetrains are generated inward; therefore, if these output gears on the output gear shafts, which generate inward thrust directional forces, are utilized in a speed reducer casing that has a three-piece structure composed of a center casing and a left and a right side casings fixed to two side surfaces of the center casing, the left and the right side casings do not receive forces in directions separating from the center casing.

Hence, it is possible to effectively prevent leakage of lubrication oil from between contact surfaces of the center casing and the left and the right side casings, and to prevent entry of muddy water from outside.

Also, it becomes possible to decrease the number of bolts necessary to fix the center casing and the left and right side casings; to reduce increase in screw hole machining cost and parts cost; and to decrease weight and size.

DESCRIPTION OF EMBODIMENTS

Hereinafter, embodiments of the present invention will be described based on the attached drawings.

Figure 1:
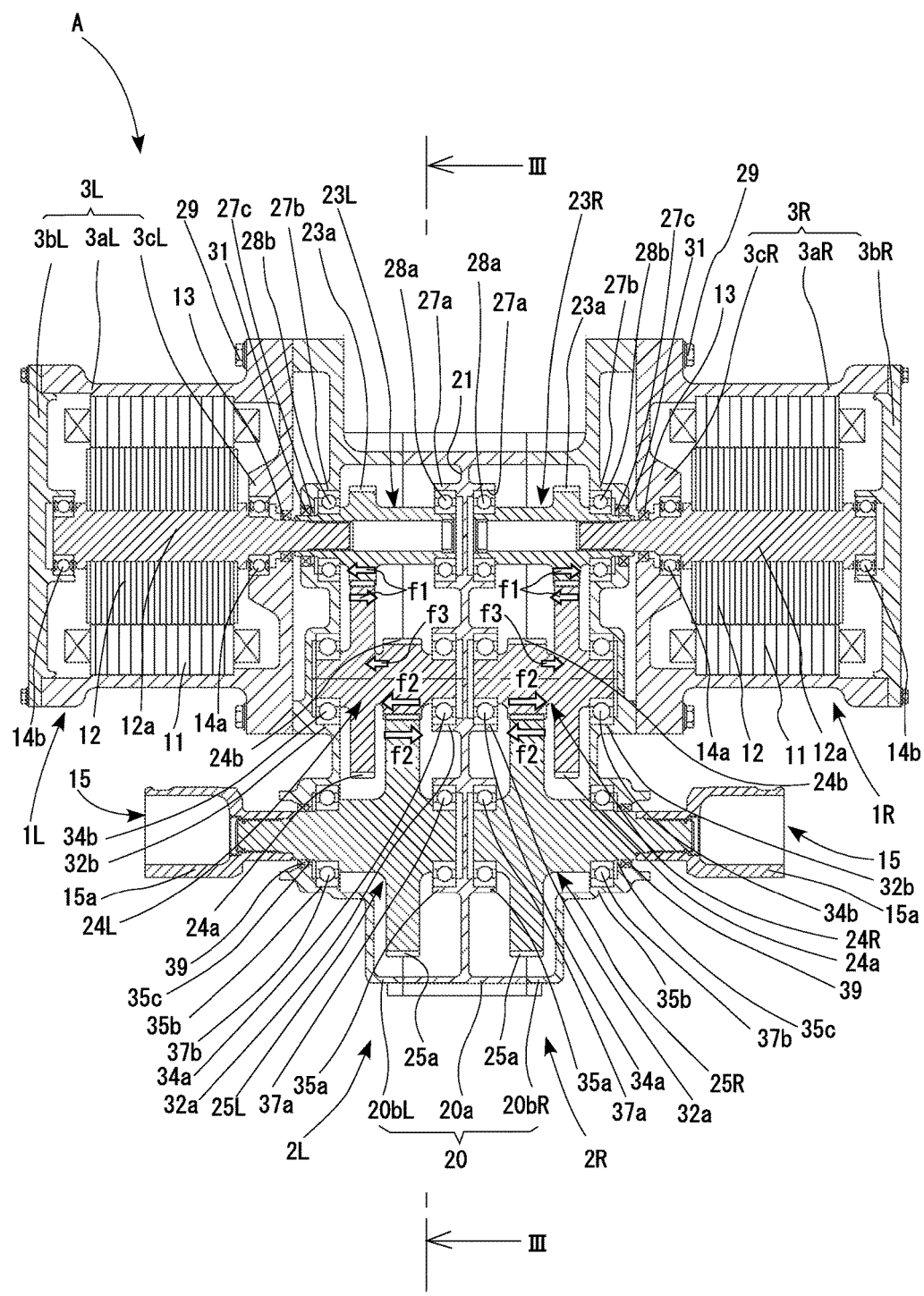
FIG. 1 is a cross-sectional plan view which shows an embodiment of a two-motor vehicle-driving apparatus according to the present invention.
Figure 2:
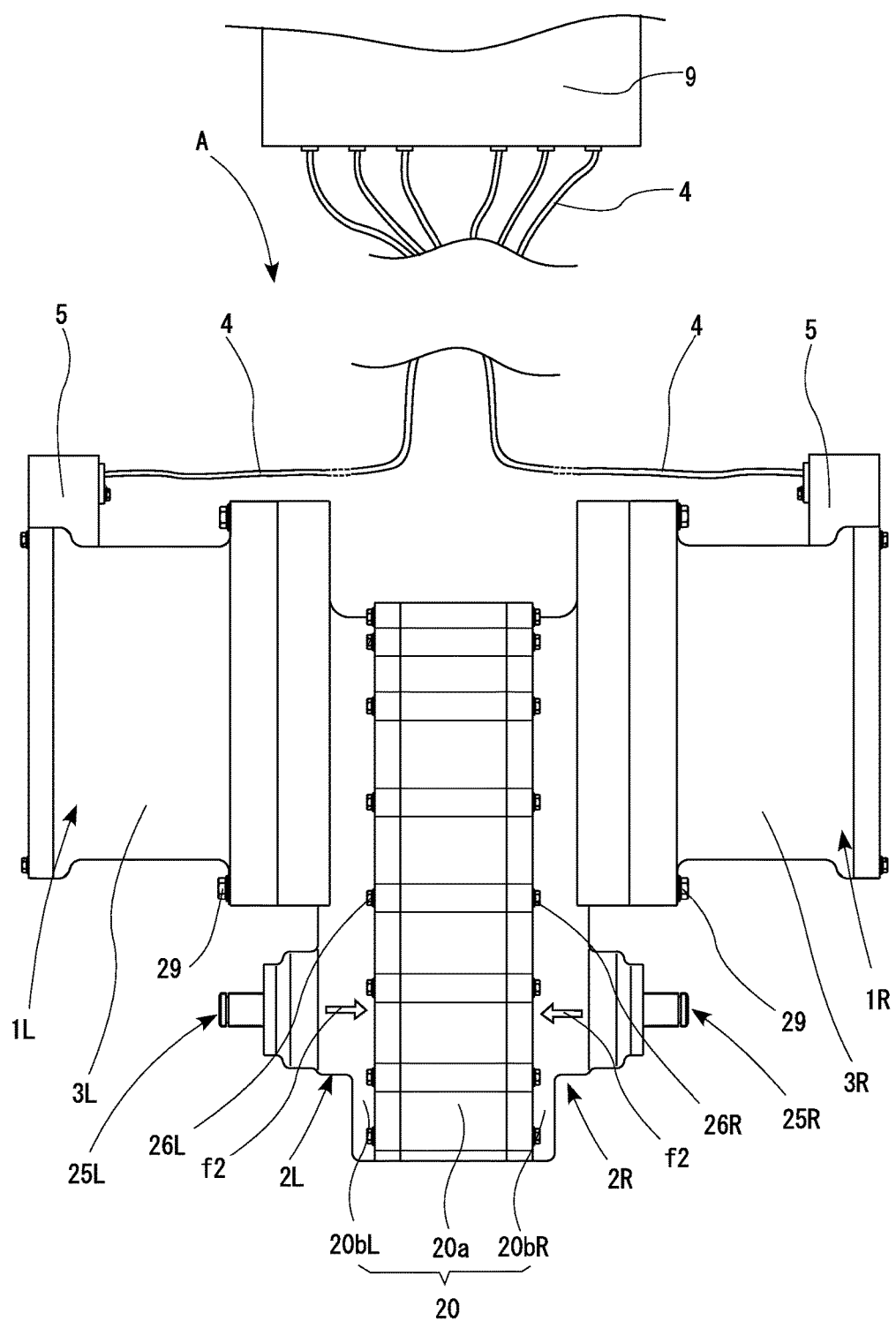
FIG. 2 is a plan view of the embodiment in FIG. 1.

As shown in FIG. 1 and FIG. 2, a two-motor vehicle-driving apparatus A according to the present invention utilizes a structure that a speed reducer casing 20, which houses two speed reducers 2L, 2R side by side on left and right, is disposed at a center; and motor casings 3L, 3R of two electric motors 1L, 1R are fixed to a left side and a right side respectively of the speed reducer casing 20.

Figure 5:
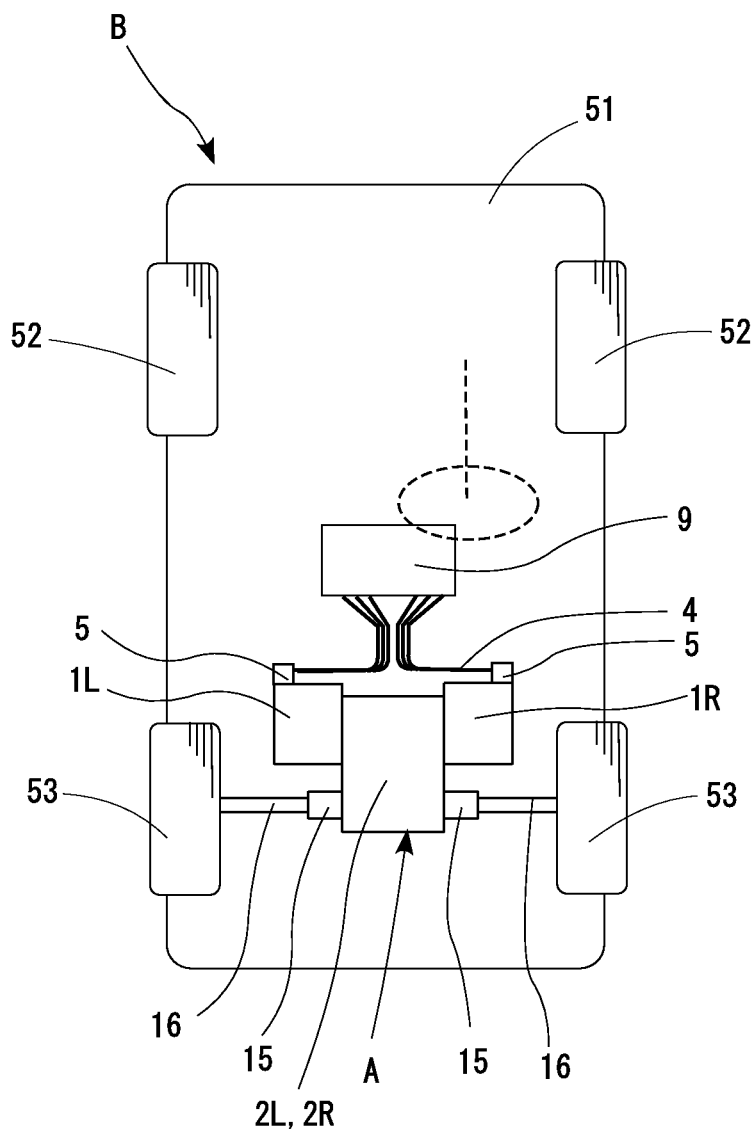
FIG. 5 is a schematic plan view which shows an electric vehicle utilizing the two-motor vehicle-driving apparatus according to the present invention.
Figure 6:
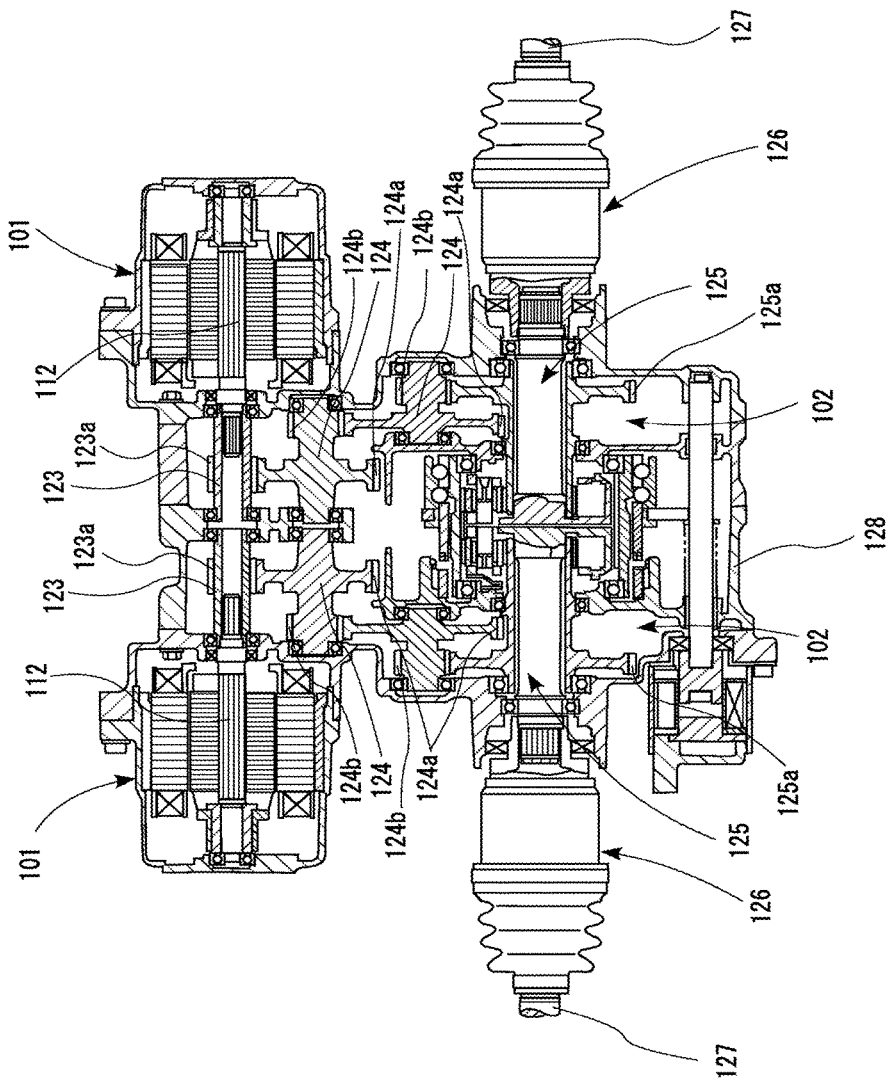
FIG. 6 is a cross-sectional plan view which shows an example of conventional two-motor vehicle-driving apparatus.
Figure 7:
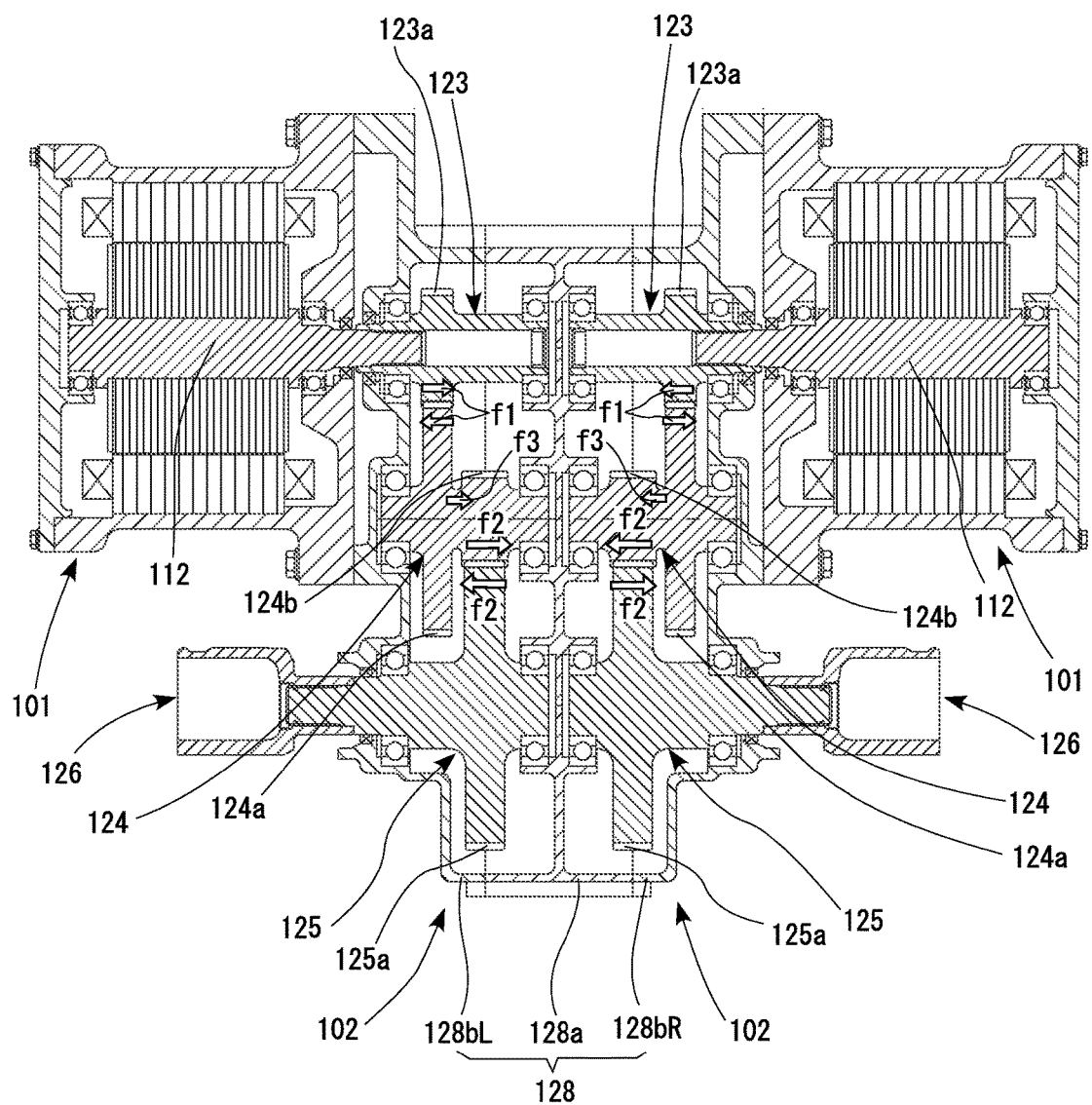
FIG. 7 is a cross-sectional plan view which shows a two-motor vehicle driving apparatus having a three-piece-structure speed reducer casing which utilizes the conventional combination of helix directions in their helical gears.
Figure 8:
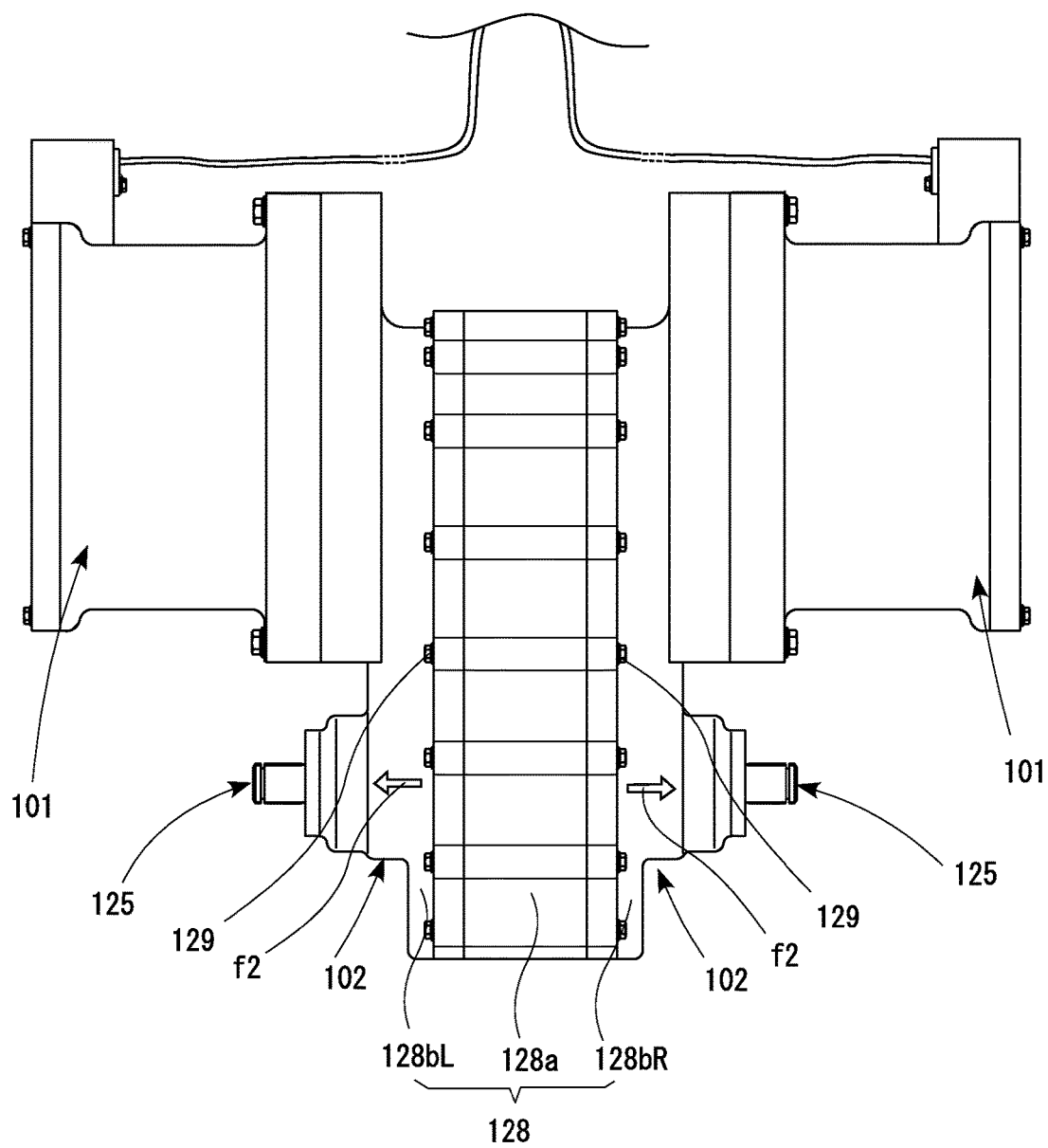
FIG. 8 is a plan view of the apparatus in FIG. 7.

As shown in FIG. 5, an electric vehicle B is a rear-wheel drive type, and includes a chassis 51; front wheels 52 as steering wheels; rear wheels 53 as driving wheels; and the two-motor vehicle-driving apparatus A which drives the left and the right rear wheels 53 independently from each other. The two-motor vehicle-driving apparatus A is mounted on the chassis 51, at a center position between the left and the right rear wheels 53. Driving power from the two-motor vehicle-driving apparatus A are transmitted to the rear wheels 53 via constant velocity joints 15 and intermediate shafts 16. At a center of the chassis 51, there is placed an inverter 9 which supplies electric power to the two-motor vehicle driving apparatus A.

It should be noted here that the two-motor vehicle driving apparatus A is also applicable, in addition to rear wheel drive systems as shown in FIG. 5, to front wheel drive systems and four-wheel drive systems.

As shown in FIG. 1 and FIG. 2, the left and the right electric motors 1L, 1R in the two-motor vehicle-driving apparatus A are housed in the motor casings 3L, 3R.

As shown in FIG. 2, the motor casings 3L, 3R of the two, left and right electric motors 1L, 1R have their outer surfaces at their outboard-side (laterally outer side of the vehicle) end portions mounted with terminal boxes 5, into which three-phase UVW power lines 4 are extended out of the left and right motor casings.

The motor casings 3L, 3R respectively have cylindrical motor casing main bodies 3aL, 3aR; outboard walls 3bL, 3bR which close outboard side faces of the motor casing main bodies 3aL, 3aR; and inboard walls 3cL, 3cR which make separation from the speed reducers 2L, 2R in an inside surface of the motor casing main body 3aL, 3aR. The inboard walls 3cL, 3cR of the motor casing main bodies 3aL, 3aR are formed with openings for motor shafts 12a to extend therefrom.

As shown in FIG. 1, the electric motors 1L, 1R are provided by radial gap motors wherein each of the motor casing main bodies 3aL, 3aR has their inner circumferential surface provided with a stator 11, and the stator 11 has its inner circumference opposed by a rotor 12 at a distance. It should be noted here that the electric motors 1L, 1R may be provided by axial gap type motors.

The rotor 12 has a motor shaft 12a through its center. The motor shaft 12a extends out of the openings formed in the inboard walls 3cL, 3cR of the motor casing main bodies 3aL, 3aR toward the speed reducers 2L, 2R respectively. Seal members 13 are placed between respective openings in the inboard walls 3cL, 3cR of the motor casing main bodies 3aL, 3aR and the motor shafts 12a.

The motor shafts 12a are rotatably supported by the inboard walls 3cL, 3cR and outboard walls 3bL, 3bR of the motor casing main bodies 3aL, 3aR via rolling bearings 14a, 14b (FIG. 1).

As shown in FIG. 1 and FIG. 2, the speed reducer casing 20, which houses the two speed reducers 2L, 2R provided side by side on left and right, has a three-piece structure, including a center casing 20a, and a left and a right side casings 20bL, 20bR which are fixed to respective sides of the center casing 20a. As shown in FIG. 2, the left and right side casings 20bL, 20bR are fixed onto two side openings in the center casing 20a, with a plurality of bolts 26L, 26R.

By utilizing a plurality of bolts 29 to fix outboard side surfaces of the side casings 20bL, 20bR of the speed reducer casing 20 and the inboard walls 3cL, 3cR of the motor casing main bodies 3aL, 3aR of the electric motor 1L, 1R, the two electric motors 1L, 1R are securely disposed on the left and the right sides of the speed reducer casing 20 (FIG. 1 and FIG. 2).

As shown in FIG. 1, the center casing 20a has a partition wall 21 at its center. The speed reducer casing 20 is divided into two, i.e., a left and a right portions, by the partition wall 21, to provide a left-hand side and a right-hand side storage chambers side by side to house the two speed reducers 2L, 2R independently from each other.

As shown in FIG. 1, the speed reducers 2L, 2R are disposed symmetrically with each other on left and right, and are provided by parallel-gear speed reducers including: input gear shafts 23L, 23R which have input gears 23a to receive driving power from the motor shafts 12a; intermediate gear shafts 24L, 24R which have large-diameter gears 24a for engagement with the input gears 23a, and small-diameter gears 24b for engagement with output gears 25a; and output gear shafts 25L, 25R which have output gears 25a, extend out of the speed reducer casing 20 and transmit driving power to the driving wheels via constant velocity joints 15 and intermediate shafts 16 (FIG. 5). The left and right input gear shafts 23L, 23R, intermediate gear shafts 24L, 24R, and output gear shafts 25L, 25R are coaxial with each other.

In the two-motor vehicle driving apparatus A, each of the gears 23a, 24a, 24b, 25a on all of the gear shafts 23L, 23R, 24L, 24R, 25L, 25R constituting the two speed reducers 2L, 2R are provided by a helical gear. Each of the gear shafts 23L, 23R, 24L, 24R, 25L, 25R has its two end portions supported rotatably by the speed reducer casing 20 via rolling bearings.

In the helical gear, gear teeth are skewed with respect to the gear shaft, and this causes a force generated in an axial direction (thrust direction) when driving power is transmitted.

Directions of the forces in the thrust direction generated by the helical gears in the two-motor vehicle driving apparatus A according to the present invention during forward driving are shown in FIG. 1 using arrows.

Figure 3:
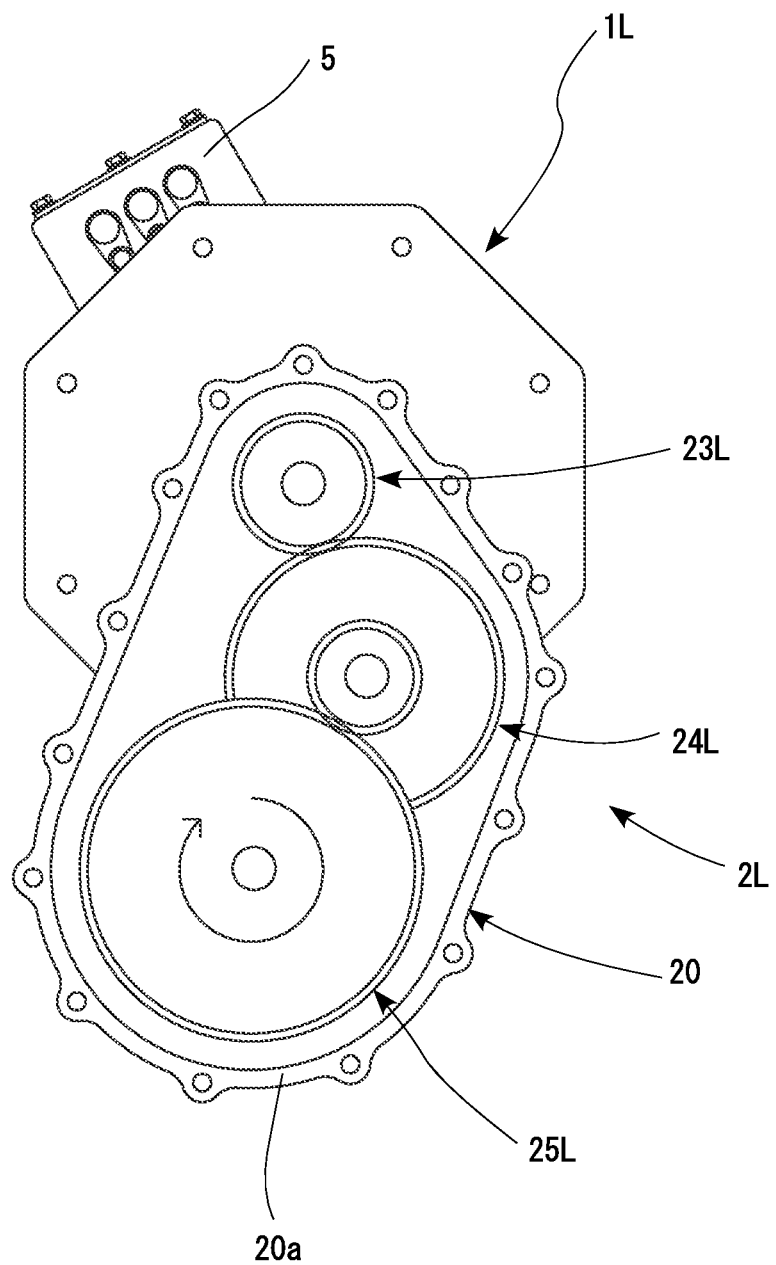
FIG. 3 is an end view of a gear train in the embodiment in FIG. 1 when viewed from a direction of a line III-III in FIG. 1.

FIG. 3 shows an end view taken from a direction of a line in FIG. 1, with an arrow indicating a rotating direction of the output gear shaft 25L. The vehicle's forward direction is an upward direction in FIG. 3. The output gear shaft 25L rotates clockwise.

As shown in FIG. 1, in the two-motor vehicle driving apparatus A according to the present invention, in each of the helical gears 23a, 24a, 24b, 25a on the gear shafts 23L, 23R, 24L, 24R, 25L, 25R of the two speed reducer 2L, 2R, a direction of a gear teeth helix is selected so that the helical gears which constitute the output gears 25a of the output gear shafts 25L, 25R generate inward thrust forces (f2) during forward drive.

Figure 4:
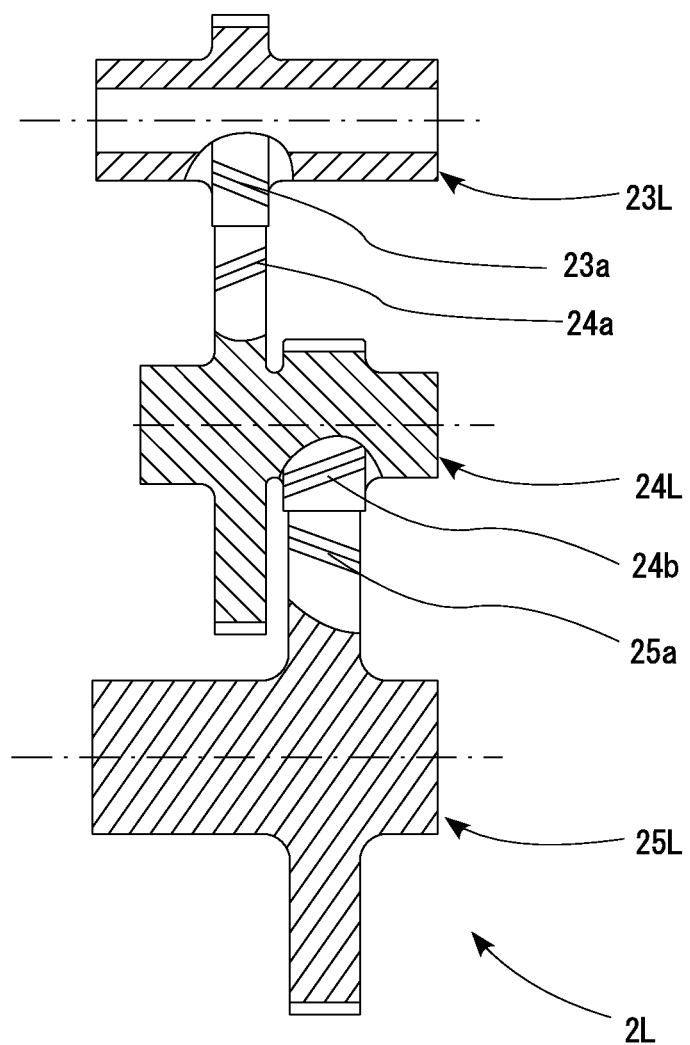
FIG. 4 is a partial sectional view which shows helical directions of helical gears in a left-hand side gear train in FIG. 1.

FIG. 4 shows the helical gears' helix directions for the gear train in the left-hand side speed reducer 2L of the two speed reducers 2L, 2R: The input gear 23a of the input gear shaft 23L has a right-hand helix; the large-diameter gear 24a of the intermediate gear shaft 24L has a left-hand helix; the small-diameter gear 24b of the intermediate gear shaft 24L has a left-hand helix; and the output gear 25a of the output gear shaft 25L has a right-hand helix. Both of the large-diameter gear 24a and the small-diameter gear 24b of the intermediate gear shaft 24L have a left-hand helix.

FIG. 1 shows directions of the thrust directional forces (f1, f2, f3) generated by the helical gears 23a, 24a, 24b, 25a in the two-motor vehicle driving apparatus A according to the present invention during forward driving.

Since the intermediate gear shafts 24L, 24R have two gears, i.e., the large-diameter gear 24a which makes engagement with the input gears 23a of the input gear shafts 23L, 23R, and the small-diameter gears 24b which makes engagement with the output gears 25a of the output gear shafts 25L, 25R, if the two thrust forces generated on the two gears have the same direction, the two forces will be combined to increase: In order to avoid this, the gears are designed so that the forces in the thrust direction (f1, f2) generated in the forward drive which is the primary direction of drive have mutually opposite directions (f1 is outward, while f2 is inward), i.e., so that the forces f1 and f2 will have a small sum of f3.

In the two, left and right speed reducers 2, i.e., in the right-hand side drivetrain and the left-hand side drivetrain, the helical gear's helical direction is selected so that the directions of the two f3 forces will be symmetrical with each other; specifically, so that both of the left and the right f3 forces are outward.

In addition, in the two, left and right speed reducers 2L, 2R, on the last-stage output gear shafts 25L, 25R in the right-hand side drivetrain and the left-hand side drivetrain, the output gears 25a are selected to generate inward forces in the thrust direction f2 in forward driving.

The output gears 25a of the output gear shafts 25L, 25R are the final-stage gear in the drivetrains, therefore receive a large load torque, and accordingly generates large forces in the thrust direction in the inward direction during the forward drive.

As described, inward forces in the thrust direction is generated in the output gears 25a of the output gear shafts 25L, 25R. Assume then, for example, that these gears are assembled in the speed reducer casing 20 which has a three-piece structure including the center casing 20a and the left and the right, side casings 20bL, 20bR fixed to the two side surfaces of the center casing 20a. In the left and the right gear trains, both of the last-stage output gears 25a generate large inward thrust forces and therefore, none of the left and the right, side casings 20bL, 20bR receives a force in the direction separating from the center casing 20a.

In the center casing 20a and each of the left and right side casings 20bL, 20bR, for a purpose of preventing lubrication oil from leaking from inside the speed reducer casing 20 or preventing muddy water from making entry from outside into the speed reducer casing 20, a sealing structure such as an O ring and liquid-form gasket is provided between contact surfaces of the center casing 20a and each of the left and right side casings 20bL, 20bR. The center casing 20a and the left and right side casings 20bL, 20bR are fixed to each other by fastening with bolts 26L, 26R (FIG. 2).

In the case where the helix direction in each of the helical gears 23a, 24a, 24b, 25a is selected so that both of the large thrust forces generated in the last-stage output gears 25a in the left and right gear trains in forward driving will have an inward direction, thrust forces generated in the output gears 25a when backing up (reverse traveling) with driving power provided by the electric motors, or when traveling forward under regenerative braking (forward coasting) will have an outward direction due to helical gears' helix directions and direction of circumferential forces exerted onto tooth flank. However, reverse driving is performed less frequently than forward driving, and reverse driving with large driving power is performed further less frequently. Therefore, outward thrust during reverse driving is not likely to pose any problems. Also, forward coasting is less frequent than forward driving, and is usually accompanied with disc braking or other means of mechanical braking. Therefore, absolute torque value is smaller than in forward driving in which driving power is supplied by the electric motors and consequently, outward thrust forces generated in the helical gears are also small enough, being unlikely to pose problems.

It should be noted here that when the electric motors are utilized as electric generators in reverse travel (rearward coasting), thrust forces will be generated in the inward direction like in the forward driving in which driving power is supplied by the electric motors, due to helix directions of the output gears 25a and direction of circumferential forces exerted onto tooth flank.

On the first stage, i.e., the input gear shafts 23L, 23R and on the second stage, i.e., the intermediate gear shafts 24L, 24R in the parallel-gear speed reducers, the thrust forces during the forward drive are outward. However, torques on the first-stage input gear shafts 23L, 23R are before speed reduction and therefore small, so their thrust forces are also small. On the second-stage, i.e., on the intermediate gear shafts 24L, 24R, the two gears, namely the large-diameter gears 24a and the small-diameter gear 24b generate thrust forces (f1, f2) in mutually opposing directions to partially canceling the forces, so resulting thrust forces are small. Hence, in comparison with the conventional gear configuration in which outward thrust forces (f2) are generated by the output gears 25a of the output gear shafts 25L, 25R on the third-stage, forces acting in the directions to separate the speed reducer casings 20 are smaller.

Therefore, it is possible to decrease the number of bolts 26L, 26R necessary to fix the center casing 20a and the left and right side casings 20bL, 20bR; to reduce increase in screw hole machining cost and parts cost; and to decrease weight and size.

The input gear shaft 23L, 23R are rotatably supported, at their respective two ends, by bearing fitting holes 27a formed in two surfaces, i.e., a left and a right surfaces, of the partition wall 21 of the center casing 20a and by bearing fitting holes 27b formed in each of the side casings 20bL, 20bR, via rolling bearings 28a, 28b.

The input gear shafts 23L, 23R have their respective ends on the outboard side extended from openings 27c formed in the side casings 20bL, 20bR. An oil seal 31 is provided between each pair of the opening 27c and outboard end of the input gear shafts 23L, 23R to prevent lubrication oil from leaking from inside the speed reducers 2L, 2R and to prevent muddy water from making entry from outside.

The input gear shaft 23L, 23R are hollow, and the motor shafts 12a are inserted through these hollow input gear shafts 23L, 23R. The input gear shafts 23L, 23R and the motor shafts 12a are connected with each other by means of spline connection (including serration connection).

The intermediate gear shafts 24L, 24R are provided by stepped gear shafts each having, on their outer circumferential surface: the large-diameter gear 24a for engagement with the input gear 23a; and the small-diameter gear 24b for engagement with the output gear 25a. In these intermediate gear shafts 24L, 24R, the helical gears provided by the large-diameter gears 24a which make engagement with the input gears 23a, and the small-diameter gears 24b which make engagement with the output gears 25a, have the same helix direction as shown in FIG. 4.

The intermediate gear shaft 24L, 24R are supported, at their respective two ends, by bearing fitting holes 32a formed in two surfaces of the partition wall 21 of the center casing 20a and by bearing fitting holes 32b formed in each of the side casings 20bL, 20bR, via rolling bearings 34a, 34b.

The output gear shaft 25L, 25R, each having a large-diameter output gear 25a, are supported by bearing fitting holes 35a formed in two surfaces of the partition wall 21 of the center casing 20a and by bearing fitting holes 35b formed in each of the side casings 20bL, 20bR, via rolling bearings 37a, 37b.

The output gear shafts 25L, 25R have their respective outboard end portions extended from openings 35c formed in the side casings 20bL, 20bR, out of the speed reducer casing 20. Outer joint members 15a of a constant velocity joint 15 are connected by means of spline connection (including serration connection) to outer circumferential surfaces of the outboard ends of the extended output gear shaft 25L, 25R.

The constant velocity joints 15 connected with the output gear shafts 25L, 25R are connected with the drive wheels via respective intermediate shafts 16 (FIG. 5).

Oil seals 39 are provided between each pair of outboard end of the output gear shaft 25L, 25R and the opening 35c which are formed in the side casings 20bL, 20bR, to prevent lubrication oil from leaking from inside the speed reducers 2L, 2R and to preventing muddy water from making entry from outside.

The input gear shafts 23L, 23R, the intermediate gear shafts 24L, 24R, and the output gear shafts 25L, 25R of the two, left and right speed reducers 2L, 2R are respectively coaxial with each other.

The present invention is in no way limited by the embodiments described above, and is needless to say possible to implement in various other ways within the scope of the present invention. The scope of the present invention is described by CLAIMS and includes all variation within equivalent meaning and scope of the CLAIMS.

REFERENCE SIGNS LIST 1L, 1R: Electric Motors
2L, 2R: Speed Reducers
3L, 3R: Motor Casing
3aL, 3aR: Motor Casing Main Bodies
3bL, 3bR: Outward Walls
3cL, 3cR: Inboard walls
4: Power Line
5: Terminal box
9: Inverter
11: Stator
12: Rotor
12a: Motor Shaft
13: Seal Member
14a, 14b: Rolling Bearings
15: Constant Velocity Joint
15a: Outer Joint Member
16: Intermediate Shaft
20: Speed Reducer Casing
20a: Center Casing
20bL, 20bR: Side Casings
21: Partition Wall
23L, 23R: Input Gear Shafts
23a: Input Gear
24L, 24R: Intermediate Gear Shafts
24a: Large-Diameter Gear
24b: Small-Diameter Gear
25L, 25R: Output Gear Shafts
25a: Output Gear
26L, 26R: Bolts
27a, 27b: bearing Fitting Holes
27c: Opening
28a, 28b: Rolling Bearings
29: Bolt
31: Oil Seals
32a, 32b: Bearing Fitting Holes
34a, 34b: Rolling Bearings
35a, 35b: Bearing Fitting Holes
35c: Opening
37a, 37b: Rolling Bearings
39: Oil Seal
51: Chassis
52: Front Wheel
53: Rear Wheel
A: Two-Motor Vehicle Driving Apparatus
B: Electric Vehicle
f1, f2, f3: Force Directions

The invention claimed is:

1. A two-motor vehicle driving apparatus comprising: two electric motors for driving left and right driving wheels independently from each other; and two speed reducers for individually reducing and then transmitting powers from the two electric motors to the left and the right driving wheels; the two speed reducers are housed side by side on the left and right in a speed reducer casing disposed at a center, with two motor casings fixed respectively on the left and right thereof each for housing an electric motor therein; each of the two speed reducers is provided by a parallel-gear speed reducer including an input gear shaft having an input gear for receiving driving power from a motor shaft, an output gear shaft having an output gear for transmitting drive power to the drive wheel via a drive shaft, and an intermediate gear shaft having a large-diameter gear for engagement with the input gear and a small-diameter gear for engagement with the output gear and are disposed in parallel with each other; each gear on each gear shaft is provided by a helical gear; the speed reducer casing which houses the two speed reducers side by side on the left and right has a three-piece structure consisting of a center casing and left and right side casings fixed onto two respective side surfaces of the center casing; wherein directions of helix in the helical gears on each gear shaft are selected so that the helical gears which work as the output gears of the output gear shafts generate inward thrust forces when the electric motors are driving the vehicle in a forward direction.

2. The two-motor vehicle driving apparatus according to claim 1, wherein the helical gears on the intermediate gear shaft, one serving as the large-diameter gear for engagement with the input gear and the other serving as the small-diameter gear for engagement with the output gear, have a same helix direction.

3. The two-motor vehicle driving apparatus according to claim 1, wherein the center casing which serves as the speed reducer casing for housing the two speed reducers side by side on the left and right, and the left and the right side casings which are fixed onto two side surfaces of the center casing are bolted with each other.

4. The two-motor vehicle driving apparatus according to claim 1, wherein the center casing which serves as the speed reducer casing for housing the two speed reducers side by side on the left and right, and the left and the right side casings which are fixed onto two side surfaces of the center casing have their mutually contacting surfaces provided with a seal structure such as an O ring and liquid gasket.

\* \* \* \* \*